United States Patent
Ohishi et al.

(10) Patent No.: US 7,029,718 B2
(45) Date of Patent: Apr. 18, 2006

(54) BEVERAGE HAVING A CONCENTRATED OR PURIFIED TEA EXTRACT

(75) Inventors: Susumu Ohishi, Tokyo (JP); Kouichi Naitoh, Tokyo (JP); Masaki Iwasaki, Tokyo (JP); Yoshikazu Ogura, Tokyo (JP)

(73) Assignee: Kao Corporation, Tokyo (JP)

( * ) Notice: Subject to any disclaimer, the term of this patent is extended or adjusted under 35 U.S.C. 154(b) by 65 days.

(21) Appl. No.: 10/259,770

(22) Filed: Sep. 30, 2002

(65) Prior Publication Data

US 2003/0077374 A1 Apr. 24, 2003

(30) Foreign Application Priority Data

Sep. 28, 2001 (JP) .................................... 2001-304443
Aug. 8, 2002 (JP) .................................... 2002-231816

(51) Int. Cl.
*A23F 3/16* (2006.01)
*A23L 2/52* (2006.01)

(52) U.S. Cl. ....................................... 426/597; 426/590
(58) Field of Classification Search ................ 426/597, 426/590
See application file for complete search history.

(56) References Cited

U.S. PATENT DOCUMENTS 5,427,806 A  6/1995  Ekanayake et al.
6,268,009 B1  7/2001  Ekanayake et al.

FOREIGN PATENT DOCUMENTS

| JP | 60-156614 | 8/1985 |
|---|---|---|
| JP | 3-18013 | 4/1991 |
| JP | 3-133928 | 6/1991 |
| JP | 10-234301 | 9/1998 |
| WO | WO 02/39822 | 5/2002 |

OTHER PUBLICATIONS

L–F. Wang, et al., Journal of Agricultural and Food Chemistry, vol. 48, No. 9, XP–02227725, pp. 4227–4232, "Effects of Heat Processing and Storage on Flavanols and Sensory Qualities of Green Tea Beverage", 2000.

Database FSTA 'Online', International Food Information Service, XP–002227726, 1 page, "Method for Enhancing Foods Containing Organic Acids", 1981 (English Abstract of Japanese Examined Patent No.: 56–050555, AN 82–4–10–t0580).

The Food Industry, vol. 35, No. 14, pp. 26–30, (with English Abstracts), 1992.

S. Terada, et al., Nippon Shokuhin Kogyo Gakkaishi, vol. 34, No. 1, pp. 20–27, "Comparison of Caffeine and Cathecin Components in Infusion of Various Tea (Green, Oolong and Black Tea) and Tea Drinks", 1987 (with partial English translation).

Notice of Opposition to the Grant of Patent; Notice of Opposition(Ito En, Ltd.); Opposition No. 2003–71208; Patent No. 3342698; May 12, 2003 English translation provided.

Notice of Opposition to the Grant of Patent; Notice of Opposition(Ito En, Ltd.); Opposition No. 2003–70843; Patent No. 3329799; Mar. 31, 2003 English translation provided.

Notice of Opposition to the Grant of Patent; Notice of Opposition(Kiichiro Yoshikawa); Oposition No. 2003–72082(01); Patent No. 3378577; Aug. 13, 2003 English translation provided.

Notice of Opposition to the Grant of Patent; Notice of Opposition(Ito En, Ltd.); Opposition No. 2003–72082(02); Patent No. 3378577; Aug. 18, 2003 English translation provided.

*Primary Examiner*—Anthony Weier
(74) *Attorney, Agent, or Firm*—Oblon, Spivak, McClelland, Maier & Neustadt, P.C.

(57) ABSTRACT

Provided is a beverage having a concentrated or purified tea extract incorporated therein and containing the following ingredients (A) and (B): (A) non-polymer catechins from 0.092 to 0.5 wt. %, (B) quinic acid at a weight ratio of [(B)/(A)] falling within a range of from 0.01 to 0.1. The beverage of the present invention is suited for daily drinking, because it does not generate an uncomfortable aftertaste which will otherwise remain after bitterness or astringency peculiar to catechins is alleviated by a sweetener or the like.

5 Claims, No Drawings

BEVERAGE HAVING A CONCENTRATED OR PURIFIED TEA EXTRACT

BACKGROUND OF THE INVENTION

1. Field of the Invention

The present invention relates to beverages having a high concentration of non-polymer catechins.

2. Related Art

It is known that catechins are physiologically useful, having cholesterol-level-increase suppressing action (Japanese Patent No. 1620943) or α-amylase activity inhibitory action (Japanese Patent No. 3018013).

In order to allow catechins to exhibit such physiological effects, drinking of 4 to 5 cups of tea a day is necessary for an adult (The Food Industry, 35 (14), 26–30 (1992)). There is accordingly a demand for the development of a technique of incorporating catechins in a beverage at a high concentration, thereby enabling easier ingestion of a large amount of catechins.

Two methods for raising the concentration of catechins, which serve as an effective ingredient, in a beverage have been reported. One of the proposed methods is to add pulverized tea leaves (Japanese Patent Application Laid-Open No. Hei 10-234301). By incorporating pulverized tea leaves at a high concentration according to this method, however, the resulting beverage becomes too powdery, which damages smooth throat-feel and pleasant aftertaste. Moreover, since the resulting beverage is put on the market after going through preparation and distribution steps, the pulverized tea leaves as an effective ingredient are inevitably precipitated on the bottom of the container or floating on the surface of the beverage upon drinking. Particularly when a transparent package such as PET bottle is used, such a state having precipitates in the bottle greatly impairs its appearance and, in turn, the commodity value of the beverage. Upon drinking, the beverage bottle having a precipitate formed therein must be shaken or stirred in order to make the dispersion of pulverized tea leaves uniform.

The other method is to add catechins in the dissolved form by utilizing a concentrated green tea extract.

Since catechins in the dissolved form have a bitter or astringent taste, bitterness or astringency of a beverage containing a large amount of catechins becomes excessively strong. Bitterness or astringency upon drinking can be alleviated by the incorporation of a sweetener in the beverage, but some unpleasant taste derived from catechins remains after drinking and makes those who drink the resulting beverage uncomfortable. Accordingly, the beverage added with catechins in the dissolved form is not suited as a physiologically effective beverage which must be taken for long periods or daily.

SUMMARY OF THE INVENTION

An object of the present invention is therefore to provide a beverage suited for daily drinking which has a high concentration of catechins, and is improved in taste, more specifically, does not cause an unpleasant aftertaste which will otherwise remain after bitterness or astringency peculiar to catechins is alleviated by the addition of a sweetener.

The present inventor has found that a beverage capable of suppressing an unpleasant aftertaste of catechins which will otherwise remain on the tongue after drinking and permitting comfortable intake of a large amount of catechins is available by using in combination quinic acid and catechins at a predetermined ratio in a beverage containing a concentrated or purified tea extract.

In the present invention, there is thus provided a beverage having a concentrated or purified tea extract incorporated therein and containing the following ingredients (A) and (B):

(A) non-polymer catechins from 0.092 to 0.5 wt. %,
(B) quinic acid in the dissolved form at a weight ratio of said ingredient (B) to (A) [(B)/(A)] ranging from 0.01 to 1.0.

The beverage of the present invention is suited for daily drinking, because it is free from uncomfortable aftertaste which will otherwise remain after alleviation of the bitterness or astringency peculiar to catechins by a sweetener or the like.

DETAILED DESCRIPTION OF THE INVENTION

The term "non-polymer catechins" as used herein is a generic name of catechin, gallocatechin, catechin gallate, gallocatechin gallate, epi-catechin, epigallocatechin, epicatechin gallate and epigallocatechin gallate.

The non-polymer catechins (A) to be used in the present invention can be extracted from tea leaves manufactured from crude tea leaves selected from species belonging to Camellia spp. such as C. sinensis and C. assaimica, and the Yabukita variety or hybrid thereof, by using water or hot water, if necessary added with an extracting assistant. The manufactured tea leaves include (1) green teas such as medium green tea, coarse green tea, refined green tea, Tencha (green tea not powdered) and Kamairi-cha (tea roasted in an iron kettle instead of steamed therein), (2) semi-fermented teas which are generically called "Oolong tea", such as Ti Kuan Yin, Se-zhong, Huanjingui and Wuyi Rock Tea, and (3) fermented teas called black tea, such as Darjeeling, Uva and Keemun.

Tea is extracted by the conventional method such as stirring. Upon extraction, an organic acid or organic acid salt such as sodium ascorbate may be added to water in advance. A method of extracting in a non-oxidizing atmosphere while removing dissolved oxygen by boiling for deaeration or feeding of an inert gas such as nitrogen gas may be used in combination.

In the present invention, instead of using a direct extract from tea leaves, a concentrated or purified tea extract is incorporated in order to attain a high catechin concentration.

The term "concentrated tea extract" as used herein means the concentrate of an extract obtained by extracting tea leaves with hot water or a water soluble organic solvent. The term "purified tea extract" means a tea extract purified by a solvent or column. Examples include those prepared by the method as described in detail in Japanese Patent Application Laid-Open No. 219384/1984, 20589/1992, 260907/1993 and 306279/1993. Examples of commercially available products include "Polyphenon" of Tokyo Food Techno Co., Ltd., "Thea-furan" of Itoen, Ltd., "Sunphenon" of Taiyo Kagaku Co., Ltd. and "Sun-oolong" of Suntory Limited. In addition, catechins available from the other raw materials and chemically synthesized products can be used. The concentrated or purified tea extract may be in various forms such as solid, aqueous solution and slurry. A liquid to dissolve therein or dilute therewith the concentrated or purified tea extract is, for example, water, carbonated water or a tea extract prepared in the usual manner.

In the present invention, the concentrated or purified tea extract is employed. As the fermentation of raw material tea leaves proceeds, a polymer catechin content therein increases, leading to a decrease in a non-polymer catechin content. Accordingly, as the concentrated or purified tea extract, use of that from green tea is particularly preferred.

The beverage of the present invention contains catechins (ingredient (A)), which are non-polymers and are dissolved in water, in an amount of from 0.092 to 0.5 wt. %, preferably from 0.1 to 0.4 wt. %, more preferably from 0.1 to 0.3 wt. %, especially from 0.1 to 0.25 wt. %.

The catechin content within the above-described range facilitates intake of a large amount of catechins and does not generate strong bitterness or astringency.

Moreover, addition of a sweetener or bitterness masking agent is preferred, because it makes the resulting beverage more agreeable to drink.

Quinic acid serving as ingredient (B) of the present invention is an organic acid contained in many plants such as fruits and vegetables. In tea leaves, it is contained in an amount of 1.5 wt. % as one organic acid (Toshiro Nakabayashi, et al., "Chemistry and Function of Green Tea, Black Tea and Oolong Tea").

To the beverage of the present invention, quinic acid is added preferably in an amount of from 0.003 to 0.5 wt. %, more preferably from 0.01 to 0.3 wt. %, especially from 0.02 to 0.15 wt. %. The amount of quinic acid within this range is preferred, because it sufficiently improves the aftertaste of the beverage and owing to proper acid taste of quinic acid, the taste of the beverage is not impaired; and aftertaste which is peculiar to a beverage having a high content of catechins does not remain on the tongue after drinking.

The beverage contains ingredient (A) (non-polymer catechins) and ingredient (B) (quinic acid) at a weight ratio [(B)/(A)] of from 0.01 to 1.0, preferably from 0.01 to 0.55, more preferably from 0.02 to 0.55. Weight ratios within this range are preferred, because the taste of the beverage can be improved sufficiently and moreover, it is not impaired by the acid taste.

Since quinic acid itself has an acid taste, it can be added to a non-tea beverage containing juice, sweetener, coffee bean extract or the like within an extent not hindering the taste of the beverage with its acid taste. When quinic acid is added in such an amount as to impart the beverage with excessive acid taste, juice or sweetener can be added for taste adjustment. In the case where a beverage having a high concentration of catechins is a tea beverage containing, as a main ingredient, a green tea extract or a semi-fermented or fermented tea extract and, as an additive, a stabilizer, a pH regulator and the like, the acid taste of quinic acid tends to control the whole taste of the beverage. The preferable content of quinic acid is therefore as described below.

When a beverage having a high concentration of catechins is manufactured by mixing a fermented tea extract or a diluted solution of the concentrate of a fermented tea extract with a concentrated or purified green tea extract, a weight ratio [(B)/(A)], that is, a quotient obtained by dividing the quinic acid content (B) by the catechin content (A) (which will equally apply hereinafter), is preferably from 0.01 to 0.66, especially from 0.01 to 0.5. The fermented tea extract and the concentrate of a fermented tea extract may be used in combination.

When a beverage having a high concentration of catechins is manufactured by mixing a semi-fermented tea extract or a diluted solution of the concentrate of a semi-fermented tea extract with a concentrated or purified green tea extract, a weight ratio [(B)/(A)] is preferably from 0.01 to 0.33, especially from 0.01 to 0.25. The semi-fermented tea extract and the concentrate of a semi-fermented tea extract may be used in combination.

When a beverage having a high concentration of catechins is manufactured by mixing a green tea extract with a concentrated or purified green tea extract, a weight ratio [(B)/(A)] is preferably from 0.01 to 0.16, especially from 0.01 to 0.15.

When a concentrated or purified green tea extract is added to a beverage (non-tea beverage), such as a beverage containing a coffee bean extract, which is free of catechins and has been well balanced in taste by the addition of quinic acid, quinic acid may be added further in accordance with the amount of catechins added, leading to a relatively high weight ratio [(B)/(A)]. The weight ratio [(B)/(A)], that is, the quotient obtained by dividing the quinic acid content (B), which is to be added in accordance with the amount of catechins added, by the catechin content (A), is preferably from 0.01 to 1.0, more preferably from 0.01 to 0.5, especially from 0.01 to 0.33.

Quinic acid can be added either in the acid form or a salt form. It can also be added in the form of a composition containing quinic acid or salt thereof. If a medium for supplying quinic acid contains oxalic acid, the amount thereof is preferably adjusted so as not to exceed the content of quinic acid because it adversely affects the aftertaste upon drinking. Presence of another organic acid is not recommended.

The acting mechanism of quinic acid has not yet been revealed. Quinic acid is presumed to form weak association with catechins through hydrogen bonding, thereby controlling adsorption of catechins to bitterness receptors of the taste bud cells of the tongue, or to adsorb directly to the taste bud cells, thereby controlling the contact of the catechins with the bitterness receptors.

In the beverage, the content of catechins in the total polyphenols, as determined by tartaric acid-iron calorimetric analysis, is 10 wt. % or greater, preferably 20 wt. % or greater just after preparation.

When 30 to 98 wt. %, preferably 40 to 90 wt. % of the catechin content is composed of catechins selected from epigallocatechin gallate, gallocatechin gallate, epigallocatechin and gallocatechin, the resulting beverage has improved taste and is therefore preferred. Here, the catechins contain at least one of epigallocatechin gallate, gallocatechin gallate, epigallocatechin and gallocatechin, but usually contain them all.

When at least 45 wt. % of the catechin content is composed of a gallate ester of catechin selected from catechin gallate, epicatechin gallate, gallocatechin gallate and epigallocatechin gallate, the resulting beverage is preferred from the viewpoint of the physiological effect of catechins.

From the viewpoint of taste and chemical stability of catechins, the beverage is preferably adjusted to have pH at 25° C. of from 2 to 7, preferably from 3 to 7.

This combination of catechins and quinic acid can be provided as is as a beverage. Alternatively, tea beverages can be prepared by mixing them with the extract of another tea green tea, black tea or Oolong tea, while a variety of catechin-containing non-tea beverages can be provided by using them in combination with juice, coffee bean extract or the like. Examples of the non-tea beverage include soft drinks such as carbonated beverages, fruit-extract-containing beverages, vegetable-extract-containing juices, near-water drinks, sports beverages and diet drinks.

In the beverage of the present invention, additives such as antioxidants, perfumes, inorganic acids, inorganic acid salts, inorganic salts, colorants, emulsifying agents, preservatives, seasonings, sweeteners, acidulants, fruit juice extracts, vegetable extracts, nectar extracts, pH regulators and quality stabilizers can be incorporated. They may be used either singly or in combination.

For example, the sweeteners include sugar, glucose, fructose, isomerized liquid sugar, glycyrrhizin, stevia, aspartame, and oligosaccharide such as fructo-oligosaccharide, galacto-oligosaccharide, and cyclodextrins. As the cyclodextrins, any one of α-, β-, γ-, branched α-, branched β- and branched γ-cyclodextrins can be used. It is preferably added in an amount of from 0.05 to 1 wt. %, preferably from 0.05 to 0.5 wt. % to the beverage.

The acidulants include, as well as juices extracted from natural substances, citric acid, tartaric acid, malic acid, lactic acid, fumaric acid and phosphoric acid. The acidulant is preferably added in an amount of from 0.01 to 0.5 wt. %, preferably from 0.01 to 0.3 wt. % to the beverage.

The inorganic acids or salts thereof include phosphoric acid, disodium phosphate, sodium metaphosphate and sodium polyphosphate. They are each preferably added in an amount of from 0.01 to 0.5 wt. %, more preferably from 0.01 to 0.3 wt. % to the beverage.

As a container to be used for the beverage, ordinarily employed ones such as molded containers (so-called PET bottles) composed mainly of polyethylene terephthalate, metal cans, paper containers lined with a metal foil or plastic film and bottles can be used. Here, the term "beverage" means a beverage which can be taken without dilution.

The beverage of the present invention is, for example, filled in a package such as a metal can and, if the package can be sterilized by heating, the packaged beverage is sterilized under conditions as specified by Food Sanitation Law. When the package is not suited for retort sterilization, for example, PET bottle or paper container, employed is a method of sterilizing the beverage at high temperature for short time by a plate type heat exchanger or the like, cooling it to a predetermined temperature and then, filling it in the package. Alternatively, under sterile conditions, another ingredient may be filled in a package having the beverage already filled therein.

Examples

Examples 1 to 6, Comparative Examples 1 to 3

In each of Examples and Comparative Examples, ingredients shown in Table 1 were mixed, followed by predetermined treatment, whereby a packaged beverage was prepared.

TABLE 1

(g)

| | Invention product (Example) | | | | | | Comparative product | | |
|---|---|---|---|---|---|---|---|---|---|
| | 1 | 2 | 3 | 4 | 5 | 6 | 1 | 2 | 3 |
| Purified green tea extract (*1) | 2.1 | 2.62 | 2.3 | 2.5 | | 2.1 | 2.1 | 2.3 | |
| Concentrated green tea extract (*2) | | | | | 4.0 | | | | 4.0 |
| Caffeine | | | 0.2 | 0.3 | 0.25 | | | 0.2 | 0.25 |
| Quinic acid (*3) | 0.5 | 0.48 | 0.21 | 0.3 | 0.35 | 0.5 | | 0.21 | 1.5 |
| Oxalic acid | | | | | | 0.07 | | 0.27 | |
| Green tea extract (*4) | | | 117.6 | | | | | 117.6 | |
| Concentrate of Oolong tea extract (*5) | | | | 1.0 | | | | | |
| Concentrate of black tea extract *(6) | | | | | 0.85 | | | | 0.85 |
| Lemon juice concentrate (*7) | 10.0 | | | | | 10.0 | 10.0 | | |
| Concentrate of coffee bean extract (*8) | | 10.0 | | | | | | | |
| β-Cyclodextrin | | | 2.5 | 2.5 | 2.5 | | | 2.5 | 2.5 |
| Sodium ascorbate | | | 0.3 | 0.3 | 0.3 | | | 0.3 | 0.3 |
| Suclarose | 0.098 | 0.392 | | | 0.045 | 0.098 | 0.098 | | 0.045 |
| Sodium bicarbonate | | q.s. | q.s. | q.s. | q.s. | | q.s. | q.s. | q.s. |
| Commercially available drinking water (*9) | Balance | Balance | Balance | Balance | Balance | Balance | Balance | Balance | Balance |
| Total weight | 1000 | 1000 | 1000 | 1000 | 1000 | 1000 | 1000 | 1000 | 1000 |
| pH | 3.2 | 6.0 | 6.2 | 6.2 | 6.1 | 3.0 | 3.3 | 6.0 | 6.0 |
| Post-treatment (heating) | | | | | | | | | |
| Temperature (° C.) | 65 | 123.5 | 139 | 121 | 121 | 65 | 65 | 121 | 121 |
| Time (min) | 10 | 25 | 8 | 10 | 10 | 10 | 10 | 10 | 10 |
| Total amount of non-polymer catechins in the beverage (g/100 mL) | 0.172 | 0.154 | 0.199 | 0.209 | 0.138 | 0.17 | 0.171 | 0.203 | 0.134 |
| Gallate/non-polymer catechins | 0.57 | 0.57 | 0.58 | 0.57 | 0.53 | 0.57 | 0.57 | 0.58 | 0.53 |

TABLE 1-continued

|  | Invention product (Example) | | | | | | Comparative product | | |
| --- | --- | --- | --- | --- | --- | --- | --- | --- | --- |
|  | 1 | 2 | 3 | 4 | 5 | 6 | 1 | 2 | 3 |
| Quinic acid/non-polymer catechins | 0.289 | 0.960 | 0.129 | 0.174 | 0.457 | 0.292 | 0 | 0.127 | 1.319 |
| Appearance of beverage | Clear | Turbid | Clear | Clear | Clear | Clear | Clear | Clear | Clear |

(*1) Purified green tea extract: having a catechin content of 84 wt. % and being free of caffeine and quinic acid.
(*2) Concentrated green tea extract: having a catechin content of 35 wt. %, a caffeine content of 5.1 wt. %, and a quinic acid content of 5.7 wt. %.
(*3) Quinic acid: reagent of Tokyo Kasei Kogyo Co., Ltd.
(*4) Green tea extract: obtained by adding 40 g of green tea leaves of medium grade in 1000 g of hot water heated to 70° C., extracting for 5 minutes while stirring gently, filtering the tea leaves through a two-ply No. 2 filter paper and cooling the filtrate promptly to room temperature. The extract was lyophilized. The lyophilized green tea extract had a catechin content of 27.6 wt. %, a caffeine content of 8.5 wt. % and a quinic acid content of 4.7 wt. %.
(*5) Concentrate of Oolong tea extract: obtained by charging 40 g of Seuy Sian in 1000 g of hot water heated to 90° C., extracting for 2.5 minutes while stirring gently, filtering the tea leaves through a two-ply No. 2 filter paper, and cooling the filtrate, promptly to room temperature. The extract was lyophilized. The lyophilized extract had a solid content of 0.71 wt. %, a catechin content of 18.1 wt. %, a caffeine content of 11.1 wt. %, and a quinic acid content of 6.53 wt. %.
(*6) Concentrate of black tea extract: obtained by charging 40 g of Darjeeling in 1000 g of hot water heated to 90° C., extracting for 2.5 minutes while stirring gently, filtering the tea leaves through a two-ply No. 2 filter paper, and cooling the filtrate promptly to room temperature. The extract was lyophilized. The lyophilized extract had a solid content of 0.55 wt. %, a catechin content of 6.7 wt. %, a caffeine content of 5 wt. %, and a quinic acid content of 6.25 wt. %.
(*7) Lemon juice concentrate: commercially available
(*8) Concentrate of coffee bean extract: caffeine-less coffee having a caffeine content of 0.11 wt. % and a quinic acid content of 10 wt. %.
(*9) Commercially available drinking water: Indication: calcium content: 7.1 mg/100 mL, magnesium content: 2.4 mg/100 mL, sodium content: 4.7 mg/100 mL.

As a result of drinking test of a beverage having a high concentration of catechins by a panel of three experts, all of them admitted that in the invention products 1 to 6, uncomfortable aftertaste peculiar to catechins has been alleviated, while they judged that the comparative products 1 and 2 are not suited for continuous drinking for a long period of time, because uncomfortable aftertaste peculiar to catechins has remained and particularly the comparative product 3 has an excessive acid taste.

What is claimed is:

1. A beverage having a concentrated or purified tea extract incorporated therein and containing the following ingredients (A) and (B):
    (A) non-polymer catechins from 0.092 to 0.5 wt. %,
    (B) qiuinic acid
    which is obtained by mixing a fermented tea extract or a diluted solution of the concentrate of a fermented tea extract with a concentrated or purified green tea extract; and has a weight ratio of [(B)/(A)] falling within a range of from 0.01 to 0.66.

2. A beverage of having a concentrated or purified tea extract incorporated therein and containing the following ingredients (A) and (B):
    (A) non-polymer catechins from 0.092 to 0.5 wt. %,
    (B) quinic acid
    which is obtained by mixing a semi-fermented tea extract or a diluted solution of the concentrate of a semi-fermented tea extract with a concentrated or purified green tea extract and has a weight ratio of [(B)/(A)] falling within a range of from 0.01 to 0.33.

3. A beverage of having a concentrated or purified tea extract incorporated therein and containing the following ingredients (A) and (B):
    (A) non-polymer catechins from 0.092 to 0.5 wt. %,
    (B) qiuinic acid
    which is obtained by mixing a green tea extract with a concentrated or purified green tea extract and has a weight ratio of [(B)/(A)] falling within a range of from 0.01 to 0.16.

4. A beverage of any one of claims 1 to 3, wherein at least 45 wt. % of the ingredient (A) is a gallate ester of catechin.

5. A beverage of any one of claims 1 to 3, further comprising oxalic acid in an amount not greater than the content of the ingredient (B).

* * * * *